(12) United States Patent
Chansarkar

(10) Patent No.: US 6,618,670 B1
(45) Date of Patent: Sep. 9, 2003

(54) RESOLVING TIME AMBIGUITY IN GPS USING OVER-DETERMINED NAVIGATION SOLUTION

(75) Inventor: Mangesh M. Chansarkar, Sunnyvale, CA (US)

(73) Assignee: SIRF Technology, Inc., San Jose, CA (US)

(*) Notice: Subject to any disclaimer, the term of this patent is extended or adjusted under 35 U.S.C. 154(b) by 0 days.

(21) Appl. No.: 09/952,548

(22) Filed: Sep. 14, 2001

Related U.S. Application Data

(60) Provisional application No. 60/232,738, filed on Sep. 15, 2000.

(51) Int. Cl.[7] .......................... G01C 21/26; G01C 21/28
(52) U.S. Cl. .................. 701/213; 701/207; 701/214; 701/215; 342/357.04; 342/357.06
(58) Field of Search ................................ 701/207, 213, 701/214, 216, 215; 342/357.01, 357.04, 357.06

(56) References Cited

U.S. PATENT DOCUMENTS

| | | | | |
|---|---|---|---|---|
| 5,471,217 A | * | 11/1995 | Hatch et al. ............ | 342/357.01 |
| 5,786,773 A | * | 7/1998 | Murphy .................... | 340/947 |
| 5,841,026 A | * | 11/1998 | Kirk et al. ................. | 73/178 R |
| 5,916,300 A | * | 6/1999 | Kirk et al. .................. | 701/213 |
| 6,259,398 B1 | * | 7/2001 | Riley ..................... | 342/357.04 |

* cited by examiner

*Primary Examiner*—Gertrude Arthur

(57) ABSTRACT

The invention describes methods and apparatuses for determining a user position based on a minimization of the errors introduced into the GPS system because of clock bias, noise, multipath, or other uncertainties. By overdetermining position, for example, clock biases can be removed from the system.

4 Claims, 5 Drawing Sheets

RESOLVING TIME AMBIGUITY IN GPS USING OVER-DETERMINED NAVIGATION SOLUTION

CROSS-REFERENCE TO RELATED APPLICATIONS

This application claims priority under 35 U. S. C. §119(e) of U.S. Provisional Patent Application No. 60/232,738, filed Sep. 15, 2000, entitled "RESOLVING TIME AMBIGUITY IN GPS USING OVER-DETERMINED NAVIGATION SOLUTION," by Mangesh M. Chansarkar, which application is incorporated by reference herein.

BACKGROUND OF THE INVENTION

1. Field of the Invention

The present invention relates in general to Global Positioning System (GPS) receivers, and in particular to resolving time ambiguity in GPS using an over-determined navigation solution.

2. Description of the Related Art

In GPS, there are four variables, namely, position determined by x, y, and z coordinates, and time (x, y, z, and t). These variables are determined by using triangulation techniques and accurate system clocks to determine the location of a GPS receiver through range, range-rate, and pseudo-range measurements made by or at the GPS receiver.

To accurately determine the x, y, z, and t variables, four GPS satellite signals are typically required to provide four simultaneous equations that are solved for the four variables. However, in many environments, such as urban canyons, in buildings, or other weak-signal environments, only three satellites are visible from the GPS receiver. As such, one of the variables must be empirically determined.

It can be seen, then, that there is a need in the art for a method to empirically determine at least one of the GPS variables. It can also be seen, then that there is a need in the art for an apparatus for empirically determining at least one of the GPS variables.

SUMMARY OF THE INVENTION

To minimize the limitations in the prior art, and to minimize other limitations that will become apparent upon reading and understanding the present specification, the present invention discloses methods and apparatuses for determining time in a GPS system by overdetermining the position of a mobile GPS receiver. By overdetermining the position to very accurate measurements, the time ambiguity can be resolved to lower error limits than possible without the overdetermination algorithm.

A method for resolving a variable ambiguity in a global positioning system receiver in accordance with the present invention comprises determining a plurality of pseudoranges to a plurality of Global Positioning System satellites, determining a range for each of the pseudoranges, wherein the range gives a maximum and a minimum for each of the pseudoranges, and minimizing a distance from an estimate of user position to the maximum and minimum for the plurality of pseudoranges.

It is an object of the present invention to provide a method to empirically determine at least one of the GPS variables. It is a further object of the present invention to provide an apparatus for empirically determining at least one of the GPS variables.

BRIEF DESCRIPTION OF THE DRAWINGS

Referring now to the drawings in which like reference numbers represent corresponding parts throughout.

DETAILED DESCRIPTION OF THE DRAWINGS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

In a GPS receiver, initially, none of the four variables has any accuracy associated with the measurement of the variable because nothing is known about the position of the receiver. However, once a satellite or multiple satellites are acquired, and the code tracking of one or more satellites commences, the system time can be accurately resolved within 1 ms (the code repetition rate). When the bit synchronization of the code is complete, system time can be resolved within 20 ms (bit period).

Once code tracking and bit synchronization have occurred, a consistent measurement set (e.g., a set of x, y, z, and t measurements) can be constructed if the user position is known to within a few tens of Kilometers (km) and time is known to within a few tens of seconds. This approach gives a consistent set of pseudorange measurements, but all these measurements have a unknown clock bias which cannot be resolved in the navigation (NAV) solution directly. The NAV solution will compute the clock bias, but the position solution will be in error due to incorrect satellite location computation.

For example, if the pseudoranges have an ambiguity of 1 second then the satellite positions have an error of approximately 3 Km (which is equivalent to the orbital speed of the GPS satellites) and this will show up as an error in the position computation. If the solution is exactly determined (4 measurements only) then this cannot be resolved unless external information is used (for example surface of the earth or known altitude of the satellites), but if the solution is over determined then this ambiguity can be resolved autonomously.

GPS Location Principles

Figure 1:
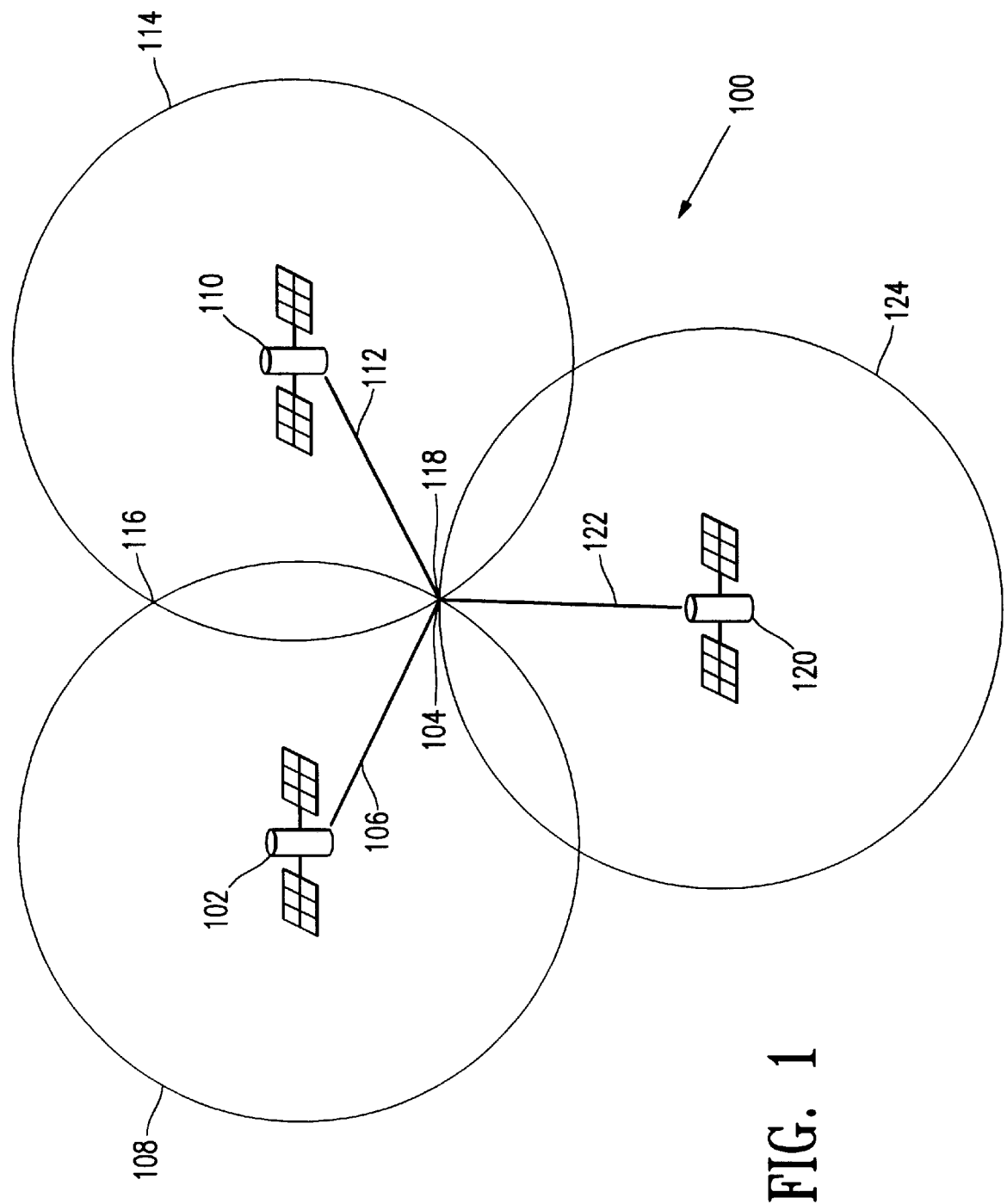
FIG. 1 illustrates the principles used in the Global Positioning System to determine user location.

FIG. 1 illustrates the principles used in the Global Positioning System to determine user location.

To more easily illustrate how GPS works, a two dimensional example is described herein. As additional dimensions, e.g., the z-direction, and time, are added, similar computations and figures will result, but for ease of explanation, two dimensions are presented herein.

System 100 shows GPS satellite SV1 102, and user 104. User 104 receives signals from SV1 102, and computes a pseudorange 106 to SV1 102. At this point, pseudorange 106 tells user 104 that user 104 is a given distance from SV1 102, shown as circle 108.

Similarly, and at the same time, user 104 receives signals from SV2 110, and computes pseudorange 112. Again, pseudorange 112 tells user 104 that user 104 is a given distance away from SV2 110, shown as circle 114. Thus, when computations are made with both pseudoranges 106 and 112, two possible solutions are given, namely the user 104 can be at position 116 or position 118.

For a single location to be determined, signals from satellite SV3 120 are received and processed at the same time as the signals from SV1 102 and SV2 110. Pseudorange 122 is calculated from the signals emanating from SV3 120, which generate circle 124. The intersection of circles 108, 114, and 124 only intersect at one point, namely, position 118, which is user 104's position.

Figure 2:
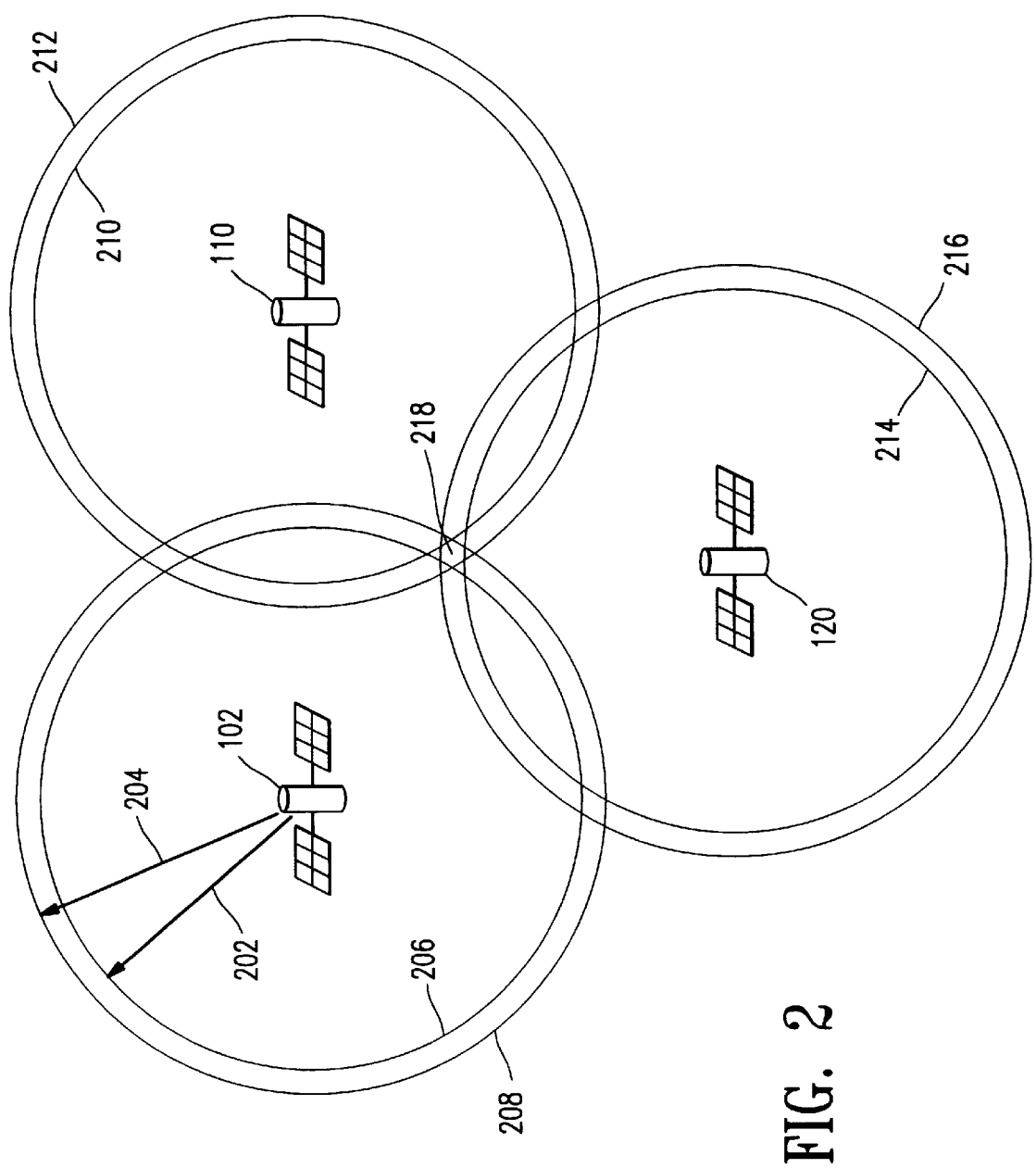
FIG. 2 illustrates the principles used in the Global Positioning System wherein noise and other real-life effects are included in the positioning calculations.

FIG. 2 illustrates the principles used in the Global Positioning System wherein noise and other real-life effects are included in the positioning calculations.

The calculations and pseudoranges calculated as described in FIG. 1 are for a GPS system without any noise introduced into the system. However, multipath problems, time inaccuracies, and other noise problems will create uncertainties in the pseudorange calculation. As such, each pseudorange calculation will generate a range of pseudorange values. So, for each GPS satellite used in the position calculation, multiple circles will be generated for each received signal. For a given satellite, e.g., SV1 102, a range of pseudoranges will be calculated, namely between pseudorange 202 and pseudorange 204, because of noise and other uncertainties in the system. These pseudoranges 202 and 204 then generate two different distance circles, namely circle 206 and circle 208. In a similar fashion, SV2 110 will generate a range of pseudoranges, which will generate distance circles 210 and 212, and SV3 120 will generate a third range of pseudoranges, which will generate distance circles 214 and 216.

The intersection of the areas between the distance circles 206 and 208, 210 and 212, and 214 and 216, is area 218. It is in this area, not at this point, that user 104 is located. Current GPS receivers determine the best estimate of where user 104 is, based on area 218 and minimizing the distance from the estimated position of user 104 to the boundaries of area 218, and/or minimizing the distance from the estimated position to the boundaries of all satellites that are used for the position determination.

Figure 3A:
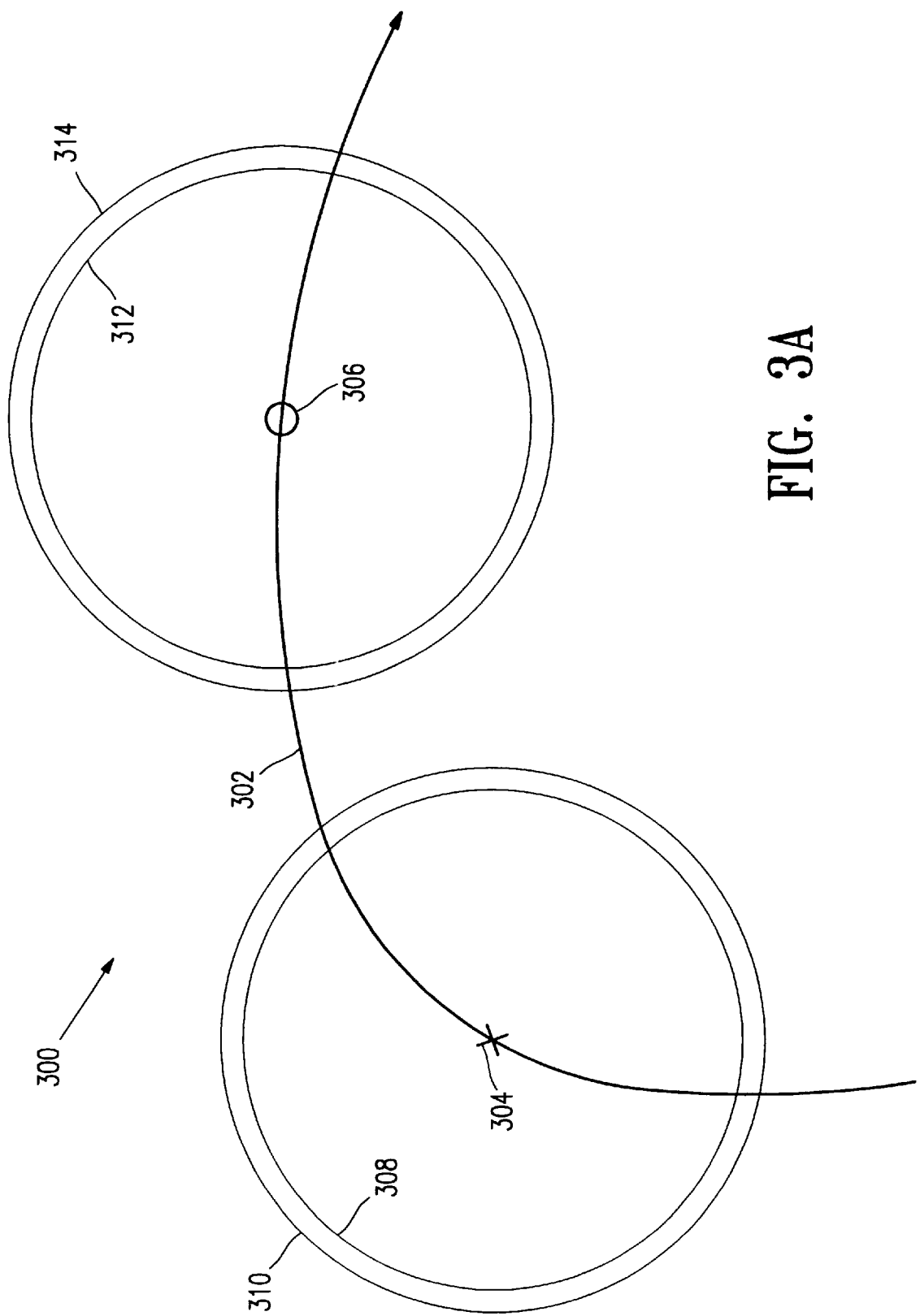
FIG. 3A shows the trajectory for a given GPS satellite as used in the present invention.

FIG. 3A shows the trajectory for a given GPS satellite as used in the present invention.

System 300 shows trajectory 302, where a given satellite in the constellation travels from point 304 at a first time to point 306 at a second time. At each point along the trajectory, each satellite will generate different distance circles for a given user location, and the noise associated with the distance circles generated can change from time to time, because at position 304, the satellite may be in clear view, whereas at position 306, the satellite can be blocked or in a multipath condition for the user. As such, each position along the trajectory 302 will have different distance circles and different noise values, as shown by distance circles 308 and 310 associated with position 304, and distance circles 312 and 314 associated with position 306.

Figure 3B:
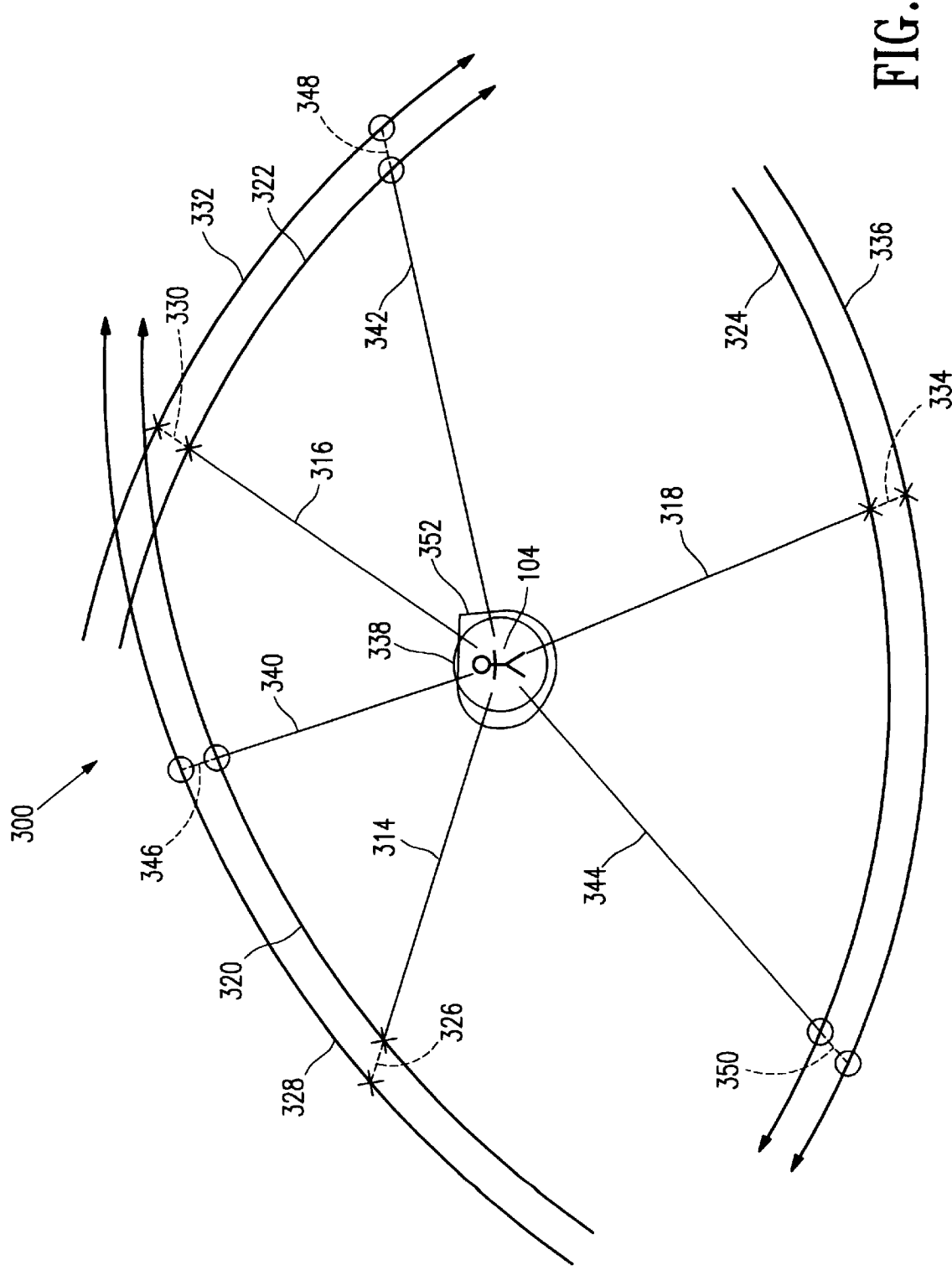
FIG. 3B illustrates another frame of reference for the Global Positioning System in accordance with the present invention.

FIG. 3B illustrates another frame of reference for the Global Positioning System in accordance with the present invention.

System 300, as a GPS system, determines the location of a user 104 by determining distances from the user 104 to satellites in the GPS constellation. As shown in FIG. 3A, those distances are not exactly determinable because of noise and other factors, and are represented as concentric distance circles from each satellite, which results in uncertainties for the user position. From the user perspective, shown in FIG. 3B, the user determines distances to each satellite, which have.some uncertainties, and, thus, the user cannot determine exactly where user 104 is.

For example, user 104 determines first pseudoranges 314, 316, and 318 at a first time, for three satellites on estimated trajectories 320, 322, and 324, respectively. However, because of noise, clock bias, and other uncertainties in the GPS system, user 104 is unsure of each measurement by some factor, which means that first pseudorange 314 may have to add in factor 326, which, in effect, means that that given GPS satellite may be on trajectory 328. Similarly, noise and other effects may add factor 330 to the second pseudorange 316, placing the GPS satellite on trajectory 332, and may add factor 334 to pseudorange 318 placing third GPS satellite on trajectory 336. This means that there is uncertainty in the user 104 position in every direction because of the factors 326, 330, and 334, which creates area 338 as to where the user 104 is likely located.

At a second time, the user 104 determines pseudoranges 340, 342, and 344. Again, because of noise, clock bias, or other uncertainties in the system, each pseudorange 340, 342, and 344 has uncertainties associated with it, and therefore each pseudorange 340, 342, and 344 must have factors 346, 348, and 350, respectively, potentially added to the pseudoranges 340–344, to properly determine the user 104 location. These uncertainties translate into an area 352, which may or may not be the same area as area 338, where user 104 is most likely located.

The present invention is used to determine where, in areas 338 and/or 352, user 104 is most likely located.

Figure 4:
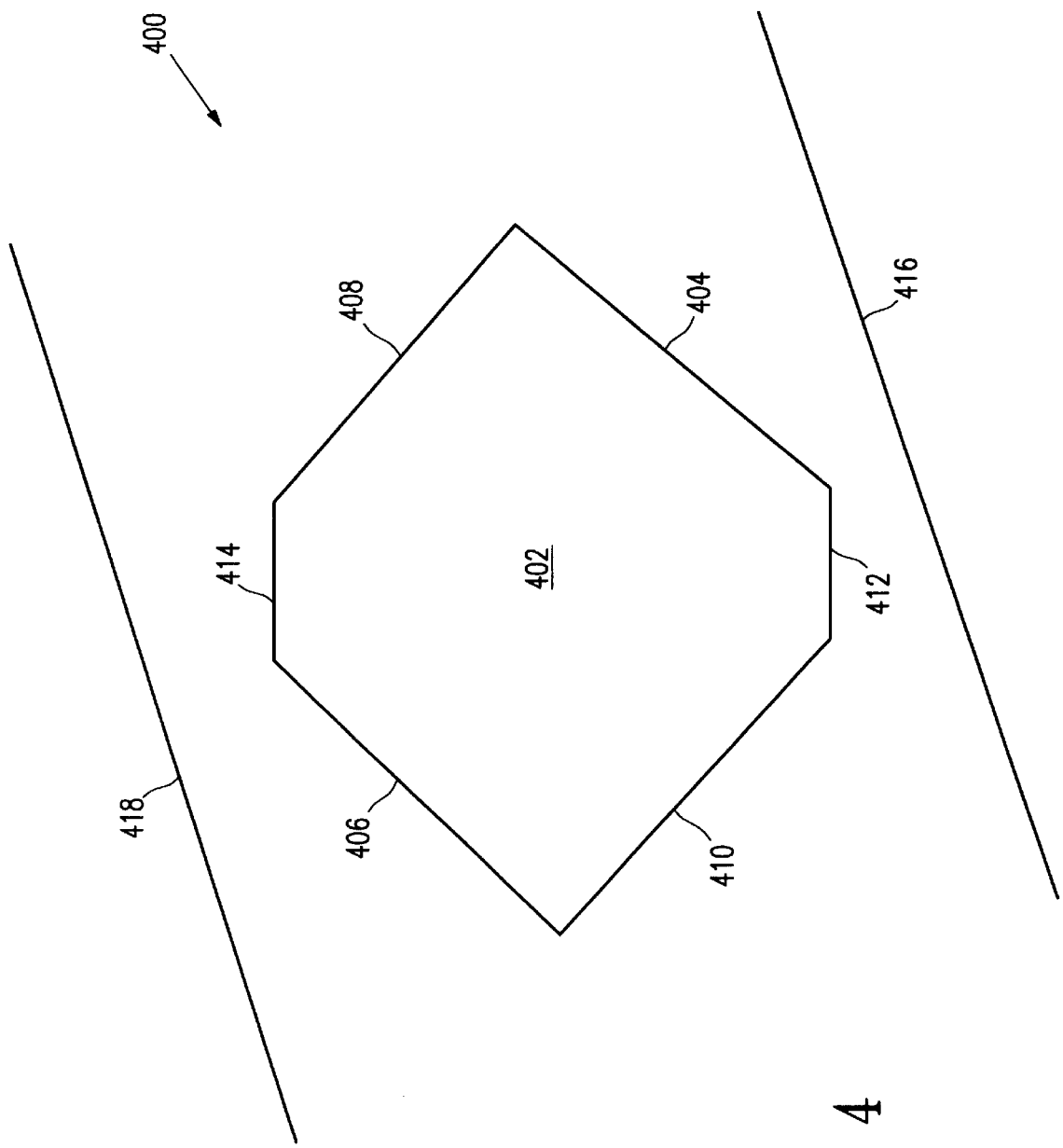
FIG. 4 illustrates the position area determined by the Global Positioning System in accordance with the present invention.

FIG. 4 illustrates the position area determined by the Global Positioning System in accordance with the present invention.

Graph 400 illustrates area 402, which is bounded by lines 404–414. Lines 404 and 406 are determined by the pseudorange measurement to SV1 102, and the distance between lines 404 and 406 is determined by the uncertainty in the pseudorange measurement to SV1 102. Similarly, lines 408 and 410 are determined by the pseudorange measurement to SV2 110, and the distance between lines 408 and 410 is determined by the uncertainty in the pseudorange measurement to SV2 110. Lines 412 and 414 are determined by the pseudorange measurement to SV3 120, and the distance between lines 412 and 414 is determined by the uncertainty in the pseudorange measurement to SV2 120. Other satellites can also be used in the positioning determination, which can generate lines 416 and 418, which may or may not intersect any of lines 404–414.

Once all of the lines that bound area 402 are determined, and any additional lines such as lines 416 and 418 are determined, the present invention uses a minimization routine to minimize the distance from the best estimate of user position to each of the lines 404–418 that was determined by the user. This will minimize the effects of errors in each of the pseudorange measurements.

Overdetermination Procedure

The following procedure can be used to resolve the clock ambiguity and compute the correct clock bias and user position.

Let Pxi, Pyi and Pzi denote the satellite locations for the $i^{th}$ GPS satellite computed for use in the NAV solution.

These are computed at a wrong time due to the clock ambiguity. Let Vxi, Vyi and Vzi be the GPS satellite velocities computed for use in the NAV solution. Let Pri be the pseudorange for the $i^{th}$ satellite. Let X, Y, Z, and B be the computed user position and clock bias, respectively.

The residual Zi for the $i^{th}$ satellite is computed as follows:

$$Zi = Pri - \sqrt{[(Pxi + \Delta T\, Vxi - X)^2 + (Pyi + \Delta T\, Vyi - Y)^2 + (Pzi + \Delta T\, Vzi - Z)^2]} - B$$

where $\Delta T$ is the time ambiguity to be resolved. If there are more than 4 measurements available then this can be resolved by minimizing the quantity $\Sigma Zi^2$. The summation is carried over the number of measurements. This is a multivariable minimization problem where $\Sigma Zi^2$ must be minimized with respect to $\Delta T$, X, Y, Z, B. For analytical simplicity this can be broken down in two separate minimizations where the quantity $\Sigma Zi^2$ is minimized with respect to $\Delta T$ and then the user Position and clock bias is computed thus minimizing the cost function ($\Sigma Zi^2$) with respect to X, Y, Z, B.

The minimization with respect to $\Delta T$ can be accomplished by setting the derivative with respect to $\Delta T$ equal to 0 as follows.

$$\delta \Sigma Zi^2 / \Delta T = 0$$

A simple reorganization of terms leads to a liner equation in $\Delta T$ which can be solved easily.

$$\Delta T = -\Sigma(Ri * LOSVi) / \Sigma(SVVi^2)$$

where

Ri=Geometric Range to $i^{th}$ satellite from the estimated user location.

SVVi=Speed of $i^{th}$ GPS satellite.

LOSVi=Line of sight speed of $i^{th}$ GPS satellite based on estimated user location.

If there are only 4 measurements and the user location and clock bias are computed using the least squares criterion then the $\Delta T$ in the above expression goes to 0 as each of the residuals computed will be identically equal to 0 for $\Delta T=0$.

This value of $\Delta T$ minimizes the sum squares of residuals from the estimated user location (which may be in error). Hence this procedure must be recursively performed to refine the time and position estimate till consecutive solutions are within acceptable errors with respect to one another.

This technique can be used to determine other variables other than time, e.g., if there is an external, highly-accurate clock available, the clock bias is reduced to zero without using the iterative process, but other variables, e.g., the z variable, may not be resolvable using the pseudorange measurements. Therefore, overdetermination of the x, y, and t variables will assist in the determination of the z variable, however, different mathematical techniques may have to be used.

The present invention is embodied in hardware and/or software that is used to perform the computations described above. Different embodiments of the invention may be used to perform different types of calculations, e.g., a single integrated circuit or piece of software can be used to perform the time ambiguity calculation, a second integrated circuit or piece of software can be used to perform the z-direction ambiguity calculation, or a single integrated circuit or piece of software can be used to perform all calculations described by the present invention. The apparatus is not limiting to the applications of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description.

What is claimed is:

1. A method for resolving a variable ambiguity in a global positioning system receiver, comprising:

determining a plurality of pseudoranges to a plurality of Global Positioning System satellites;

an error range for each of the pseudoranges, wherein the error range gives a maximum and a minimum for each of the pseudoranges; and minimizing a distance from a predetermined estimate of user position to the maximum and minimum for the plurality of pseudoranges.

2. The method of claim 1, wherein a variable ambiguity is known.

3. The method of claim 2, wherein the variable ambiguity is a clock bias.

4. The method of claim 1, wherein minimizing is performed by minimizing a sum squares of residuals from the estimate of user position.

* * * * *